United States Patent
Robinson

[11] Patent Number: 6,088,151
[45] Date of Patent: Jul. 11, 2000

[54] OPTICAL MODULATOR WITH VARIABLE PRISM

[75] Inventor: Kevin C. Robinson, Zionsville, Pa.

[73] Assignee: Lucent Technologies Inc., Murray Hill, N.J.

[21] Appl. No.: 09/192,652

[22] Filed: Nov. 16, 1998

[51] Int. Cl.[7] .............................. G02F 1/00; G02B 6/32
[52] U.S. Cl. .................... 359/322; 359/320; 359/245; 359/252; 385/33; 385/36
[58] Field of Search .................... 359/315, 318, 359/319, 320, 322, 245, 252, 263; 385/33, 36

[56] References Cited

U.S. PATENT DOCUMENTS

| | | | |
|---|---|---|---|
| 3,439,169 | 4/1969 | Lynch | 359/315 |
| 3,447,855 | 6/1969 | Skinner | 359/316 |
| 3,450,460 | 6/1969 | Brown, Jr. | 359/318 |
| 3,453,561 | 7/1969 | Bonner et al. | 359/322 |
| 3,575,488 | 4/1971 | Ohm et al. | 359/316 |
| 4,313,651 | 2/1982 | Miller, Jr. | 359/315 |
| 4,364,639 | 12/1982 | Sinclair et al. | 349/57 |
| 4,576,441 | 3/1986 | Kubick | 359/319 |
| 4,763,969 | 8/1988 | Khoe et al. | 385/36 |
| 4,922,186 | 5/1990 | Tsuchiya et al. | 359/315 |
| 4,973,900 | 11/1990 | Aoshima et al. | 359/315 |
| 5,513,289 | 4/1996 | Hosokawa et al. | 385/33 |
| 5,920,662 | 7/1999 | Hinkov | 359/322 |
| 5,956,441 | 9/1999 | Fairchild et al. | 385/33 |

*Primary Examiner*—Georgia Epps
*Assistant Examiner*—Evelyn A. Lester
*Attorney, Agent, or Firm*—Steve Mendelsohn

[57] ABSTRACT

An optical modulator controllably attenuates an optical signal by changing the index of refraction of an electro-optic prism in the modulator by varying the electrical bias applied to the electro-optic prism. Changing the index of refraction alters the path along which the optical signal travels through the optical modulator. By appropriately focusing the optical signal, the location of the optical signal relative to an output fiber can be controlled to vary the degree of optical coupling between the optical signal and the output fiber, thereby changing the amplitude of the outgoing optical signal. In one embodiment, the optical modulator has an electro-optic prism located between a lens and a mirror, where the mirror reflects the optical signal to pass through the prism and the lens two times: once along an input path and once along an output path. In another embodiment, the optical modulator has an electro-optic prism located between two lenses and the optical signal passes through the prism and each lens a single time, where one lens focuses the optical signal before passing through the prism and the other lens focuses the optical signal after passing through the prism.

14 Claims, 2 Drawing Sheets

OPTICAL MODULATOR WITH VARIABLE PRISM

BACKGROUND OF THE INVENTION

1. Field of the Invention

The present invention relates to optical devices, and, in particular, to optical modulators used, for example, in optical communication systems.

2. Description of the Related Art

An optical modulator is a device that modulates or varies the amplitude of an optical signal in a controlled manner. Optical modulators have many different uses in optical communication systems. For example, high-speed optical modulators are used to encode information into an optical signal generated by an optical source such as an optical laser, where the information is represented by changes in the amplitude of the optical signal. A low-speed optical modulator, also referred to as an optical attenuator, may be used in conjunction with an optical amplifier in the amplifier stage of an optical communication system, where the optical attenuator controls the overall gain of the amplifier stage to account for gradual changes in the received optical signal, for example, as the optical source ages.

SUMMARY OF THE INVENTION

The present invention is directed to an optical modulator that uses a prism made from an electro-optic material to control the degree of attenuation that is applied to a received optical signal. In particular, by controlling an electrical bias applied across the electro-optic prism, the index of refraction of the prism is changed. Changes in the index of refraction affect the directional bending of the optical signal as it passes through the electro-optic prism. The resulting changes in the direction of the optical signal will lead to changes in amplitude of the outgoing optical signal when the optical modulator is configured with an output fiber in such a way that the amplitude of the outgoing optical signal depends on the relative location of the outgoing optical signal and the output fiber.

According to one embodiment, the present invention is an optical device having an optical modulator comprising an electro-optic prism adapted to receive an optical signal along an input path and transmit the optical signal along an output path, wherein the output path is a function of an electrical bias applied to the electro-optic prism to change the index of refraction of the electro-optic prism.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
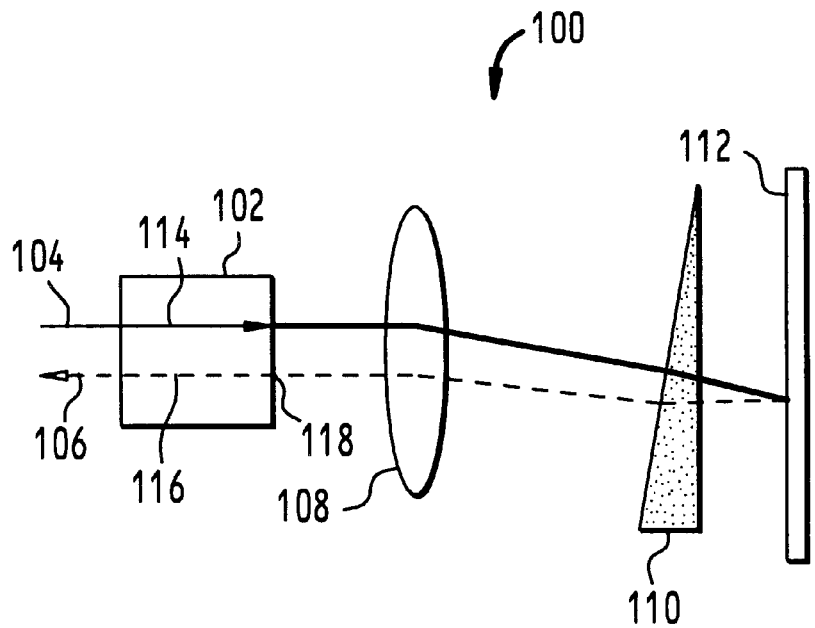
FIG. 1 shows a schematic diagram of an optical modulator, according to one embodiment of the present invention.
Figure 2:
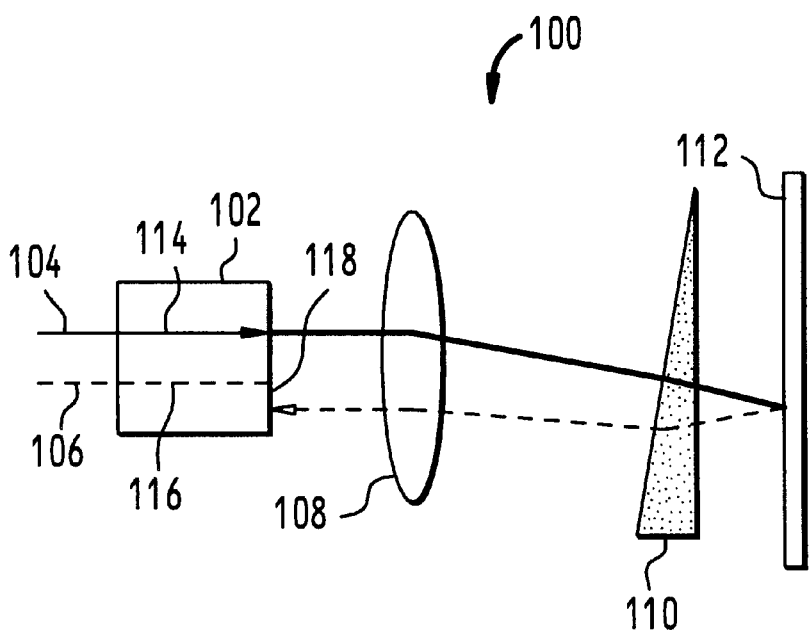
FIG. 2 shows the optical modulator of FIG. 1 configured for attenuated transmission.

FIGS. 1 and 2 shows schematic diagrams of an optical modulator 100, according to one embodiment of the present invention. Optical modulator 100 comprises a two-fiber capillary 102 configured to an input fiber 104 and an output fiber 106, a lens 108, a prism 110, and a mirror 112. Prism 110 is made from an electro-optic material, such as lithium niobate, whose index of refraction varies as a function of an appropriate electrical bias applied across the material. Anti-reflective (AR) coatings may be applied to lens 108 and prism 110 to reduce unwanted reflections.

In operation, an incoming optical signal received by optical modulator 100 from input fiber 104 is transmitted along an input path through input fiber 114 of capillary 102, which collimates the incoming optical signal for transmission through lens 108, which focuses the incoming optical signal onto prism 110, which bends the incoming optical signal for incidence on mirror 112. The optical signal is then reflected from mirror 112 for transmission along an output path through prism 110, which bends the outgoing optical signal for transmission through lens 108, which focuses the outgoing optical signal onto the input side 118 of output fiber 116 of capillary 102 for transmission through output fiber 116 of capillary 102, which collimates the outgoing optical signal for transmission along output fiber 106.

FIG. 1 shows optical modulator 100 configured for maximum transmission (i.e., minimum attenuation), where the outgoing optical signal is focused directly onto the input side 118 of output fiber 116 of capillary 102. In this configuration, a maximal amount of the outgoing optical signal is coupled into output fiber 116 and transmitted through capillary 102 to output fiber 106.

FIG. 2 shows optical modulator 100 of FIG. 1 configured for attenuated transmission, where the outgoing optical signal is focused off-center at the input side 118 of output fiber 116 of capillary 102. In this configuration, a lesser amount of the outgoing optical signal is coupled into output fiber 116 and transmitted through capillary 102 to output fiber 106 than is the case in the configuration shown in FIG. 1.

According to this embodiment of the present invention, the location of the focusing of the outgoing optical signal at the input side 118 of output fiber 116 of capillary 102 is controlled by varying the electrical bias that is applied to opto-electric prism 110. Varying the electrical bias varies the index of refraction of the prism's opto-electric material, which in turn varies the angles by which prism 110 bends both the incoming optical signal as it passes along the input path and the outgoing optical signal as it passes along the output path. Varying the bending angles applied by prism 110 alters the location at which lens 108 focuses the outgoing optical signal at the input side 118 of output fiber 116 of capillary 102, thereby varying the amount of light from the outgoing optical signal gets coupled into output fiber 116 for transmission through capillary 102 and on to output fiber 106.

In one implementation of optical modulator 100, capillary 102 contains a single-mode fiber, lens 108 is a graded index (GRIN) lens that is separated from capillary 102 by a distance of about 0.5 mm, prism 110 is a 20° prism made from lithium niobate and separated from lens 108 by a distance of about 2 mm, and mirror 112 is a fused quartz substrate with either a metallic or multilayer reflective coating that is separated from prism 110 by a distance of about 2 mm. In this implementation, an attenuation of about 10 dB can be achieved by changing the index of refraction of prism 110 by $6 \times 10^{-3}$. This can be achieved by changing the electrical bias applied across prism 110 by a suitable voltage, whose magnitude can be determined from the electro-optic coefficient and the thickness of the material used to implement the prism. For example, in an implementation in which prism 110 is a Fresnel prism, the desired change in the index of refraction can be achieved by applying an electrical bias of about 80 volts across the prism.

Depending on the implementation, optical modulator 100 can be designed such that the maximal transmission configuration of FIG. 1 corresponds to the situation in which no electrical bias is applied to prism 110. In such implementations, an electrical bias would then be applied to attenuate the outgoing optical signal as in the attenuated configuration of FIG. 2, with greater electrical biases resulting in greater attenuation. The electrical bias applied to the electro-optic prism can vary from a DC bias to an AC bias having a frequency as high as about 3 GHz, and possible even higher.

Figure 3:
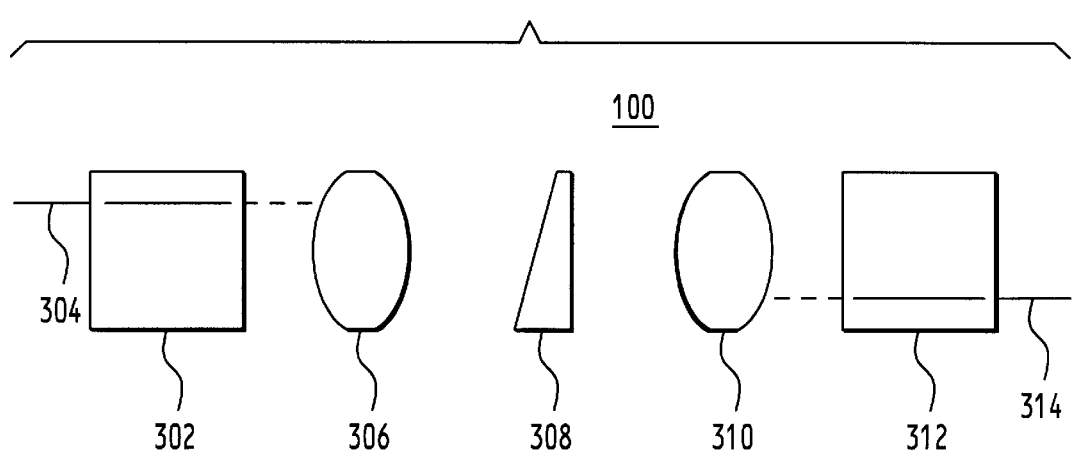
FIG. 3 shows an optical modulator, according to an alternative embodiment of the present invention.

FIG. 3 shows an optical modulator 300, according to an alternative embodiment of the present invention, in which the optical modulator couples the output fiber to the input fiber in transmission. In particular, optical modulator 300 comprises an input capillary 302 configured to an input fiber 304, an input lens 306, an opto-electric prism 308, an output lens 310, and an output capillary 312 configured to an output fiber 314. In operation, an optical signal received by optical modulator 300 from input fiber 304 is transmitted through input capillary 302, which collimates the optical signal for transmission through input lens 306, which focuses the optical signal onto prism 308, which bends the optical signal for incidence on output lens 310, which focuses the optical signal for transmission through output capillary 312, which collimates the optical signal for transmission along output fiber 314. As was the case with the embodiment of FIG. 1, the amount of attenuation is controlled by varying the electrical bias applied to the opto-electric prism to alter the index of refraction of the opto-electric material to change the location of focusing of the outgoing optical signal at the input side of the output capillary. Since the optical signal passes through prism 308 only one time in optical modulator 300, the amount of bending of the optical signal must be twice as large as the bending of the optical signal resulting from each of the two passages through prism 110 of optical modulator 100 of FIG. 1 in order to achieve the same level of attenuation.

Optical modulators 100 and 300 can be operated in an inverted manner with each output fiber acting as an input fiber and each input fiber acting as an output fiber. Moreover, each of the optical modulators can support two-way operation in which each fiber simultaneously carries optical signals in both directions.

When implemented with two two-fiber capillaries, where each capillary has an input fiber and an output fiber, an optical modulator based on the configuration of modulator 300 can operate as a two-way modulator that can simultaneously attenuate a first optical signal traveling from left to right and a second optical signal traveling from right to left through the optical modulator. Such an optical modulator can also be operated as high as a four-way modulator, where each fiber carries optical signals in both directions.

In certain embodiments of the present invention, in addition to being able to change the index of refraction of the opto-electric prism, one or more of the components in the optical modulator, such as the prism itself, can be physically tilted to control the location at which the outgoing optical signal is focused onto the output capillary. Control over the physical tilting of optical components can be achieved using technology similar to that disclosed in "The Digital Micromirror Device for Projection Display" by David W. Monk and Richard O. Gale (*Microelectronic Engineering* 27 (1995) 489–493), the teachings of which are incorporated herein by reference. For example, a tilting silicon microprism can be used in place of the tilting silicon micro-mirror taught in the reference. Since silicon is transparent in a 1.5-micrometer communications window, such a tilting silicon micro-prism can be used to controllably bend—and thereby controllably attenuate—optical signals in an optical modulator, in conjunction with a separate electro-optic prism.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An optical device having an optical modulator comprising:

an electro-optic prism adapted to receive an optical signal along an input path and the optical signal along an output path, wherein the output path is a function of an electrical bias applied to the electro-optic prism to change the index of refraction of the electro-optic prism;

an output lens positioned adjacent to an output side of the electro-optic prism to focus the optical signal along the output path; and an output capillary positioned adjacent to the output lens and adapted to collimate the optical signal received from the output lens along the output path for transmission to an output fiber.

2. The invention of claim 1, wherein the optical modulator encodes information into the amplitude of the optical signal transmitted over the output fiber by modulating the electrical bias applied to the electro-optic prism, which changes the index of refraction of the electro-optic prism, which alters the direction of the output path of the optical signal in order to modulate an amount of the output signal coupled into the output fiber.

3. The invention of claim 1, further comprising a mirror positioned adjacent to a second side of the electro-optic prism to receive the optical signal after passing through the electro-optic prism along the input path and to reflect the optical signal back to the electro-optic prism for transmission along the output path.

4. The invention of claim 3, wherein the output lens is an input/output lens and the optical signal passes through the input/output lens along both the input path and the output path.

5. The invention of claim 4, wherein the output capillary is part of a two-fiber capillary positioned adjacent to the input/output lens and adapted to collimate the optical signal received from an input fiber along the input path for transmission to the input/output lens and to collimate the optical signal received from the input/output lens along the output path for transmission to the output fiber.

6. The invention of clam 1, further comprising an input lens positioned adjacent to an input side of the electro-optic prism to receive the optical signal before passing through the electro-optic prism along the input path.

7. The invention of claim 6, further comprising:

an input capillary positioned adjacent to the input lens and adapted to collimate the optical signal received from an input fiber along the input path for transmission to the input lens.

8. The invention of claim 1, wherein the electro-optic prism is further adapted to tilt to change the output path.

9. The invention of claim 1, wherein the electro-optic prism is made from lithium niobate.

10. The invention of claim 1, wherein the electro-optic prism is a Fresnel prism.

11. An optical device having an optical modulator comprising:

an electro-optic prism adapted to receive an optical signal along an input path and transmit the optical signal along an output path, wherein the output path is a function of an electrical bias applied to the electro-optic prism to change the index of refraction of the electro-optic prism;

a first lens positioned adjacent to a first side of the electro-optic prism to focus the optical signal along at least one of the input path and the output path;

a mirror positioned adjacent to a second side of the electro-optic prism to receive the optical signal after passing through the electro-optic prism along the input path and to reflect the optical signal back to the electro-optic prism for transmission along the output path, wherein the optical signal passes through the first lens along both the input path and the output path; and a two-fiber capillary positioned adjacent to the first lens and adapted to collimate the optical signal received from an input fiber along the input path for transmission to the first lens and to collimate the optical signal received from the first lens along the output path for transmission to an output fiber.

12. An optical device having an optical modulator comprising:

an electro-optic prism adapted to receive an optical signal along an input path and transmit the optical signal along an output path, wherein the output path is a function of an electrical bias applied to the electro-optic prism to change the index of refraction of the electro-optic prism;

a first lens positioned adjacent to a first side of the electro-optic prism to focus the optical signal along at least one of the input path and the output path;

a second lens positioned adjacent to a second side of the electro-optic prism to receive the optical signal after passing through the electro-optic prism along the input path and to focus the optical signal for transmission along the output path;

an input capillary positioned adjacent to the first lens and adapted to collimate the optical signal received from an input fiber along the input path for transmission to the first lens; and an output capillary positioned adjacent to the second lens and adapted to collimate the optical signal received from the second lens along the output path for transmission to an output fiber.

13. An optical device having an optical modulator comprising an electro-optic prism adapted to receive an optical signal along an input path and transmit the optical signal along an output path, wherein the output path is a function of an electrical bias applied to the electro-optic prism to change the index of refraction of the electro-optic prism, wherein the electro-optic prism is further adapted to tilt to change the output path.

14. An optical device having an optical modulator comprising an electro-optic prism adapted to receive an optical signal along an input path and transmit the optical signal along an output path, wherein the output path is a function of an electrical bias applied to the electro-optic prism to change the index of refraction of the electro-optic prism, wherein the electro-optic prism is a Fresnel prism.

* * * * *

UNITED STATES PATENT AND TRADEMARK OFFICE
CERTIFICATE OF CORRECTION

PATENT NO. : 6,088,151
DATED : July 11, 2000
INVENTOR(S) : Kevin C. Robinson

It is certified that error appears in the above-identified patent and that said Letters Patent is hereby corrected as shown below:

<u>Column 4,</u>
Line 21, replace "and the optical signal" with -- and transmit the optical signal --.

Signed and Sealed this

Seventh Day of August, 2001

*Attest:*

*Nicholas P. Godici*

*Attesting Officer*

NICHOLAS P. GODICI
*Acting Director of the United States Patent and Trademark Office*